United States Patent Office 3,075,943
Patented Jan. 29, 1963

3,075,943
LATENT GASEOUS CATALYSIS
Billy E. Burgert, Midland, Mich., assignor to The Dow Chemical Company, Midland, Mich., a corporation of Delaware
No Drawing. Filed Sept. 14, 1959, Ser. No. 839,573
11 Claims. (Cl. 260—38)

This invention relates to a method for achieving latent gaseous catalysis. More particularly, the present invention involves a method for achieving latent gaseous catalysis of certain reaction systems whereby an adsorbent having a gaseous catalyst adsorbed thereon is dispersed throughout a composite reaction system containing ingredients to be catalyzed and subsequently heated sufficiently to desorb a quantity of the gaseous catalyst at an advantageous temperature level.

Large segments of the established art of catalysis relevant in some respect to the present invention are the conventional solid and gaseous catalytic systems. As to the solid catalytic systems which are operable in both gas and liquid phase systems, there are extensive and detailed reports in the literature. Such catalysts may consist of a single active component, a combination of active components or a combination of an active component or components adsorbed, absorbed or ionically bound to an inert support. They are generally employed in fixed or moving beds to bring about addition, condensation reactions, hydrogenation or dehydrogenation, oxidation, and hydration or dehydration. Although the mechanisms by which reaction initiation is accomplished vary widely, direct physical contact between the reactants and the catalytic system is usually a prerequisite for operability. In the present invention, direct physical contact between the reactants and the adsorbed catalyst is not necessary. Furthermore, it is not the adsorbtive capacity of the catalytic system for the reactants or intermingling of the reactants within the solid catalytic systems interstices which is of interest in the operation of the present invention, but instead it is the controllable desorptive capacity of a gaseous catalyst from an inert adsorbent that is one of important contributions.

In comparing the present invention to the common method for achieving gaseous catalysis, it is seen that in some aspects the two methods are antithetic. Conventional gaseous catalysis generally involves dispersing a gaseous catalyst from a limited number of sources into the reaction system, providing in effect a partial atmosphere of the gaseous catalyst. However, the present invention provides an equally effective but more limited partial atmosphere of the gaseous catalyst from nearly an infinite number of sources uniformly and intimately dispersed throughout the reaction system.

One of the advantages of such a catalytic system is that the quantity of a gaseous catalyst required for a particular reaction system is greatly reduced due to the efficiency arising from having the catalyst as a distinct but integral part of the reaction system. Also, the gaseous catalyst which is usually a deadly poison can be effectively applied in required amounts while avoiding the release of excess gaseous catalyst, thereby obviating as a secondary consequence the necessity of expensive recovery operations for free gaseous catalyst. And finally, another of the important features of this invention is that latent catalysis is made possible, providing thereby great flexibility as to the means and materials employed in the catalyzed reaction. Since there is control as to when reaction catalysis will occur, it is possible to devote the latent period of time to forming, transporting and otherwise manipulating various embodiments of the reaction system.

It is an object of the present invention to provide a novel method for effecting latent catalysis of suitable reaction systems. It is a further object of this invention to provide means of achieving a controllable latent gaseous catalysis in situ of solid and liquid composite reaction systems. Other objects will become apparent hereinafter as the invention is described.

The method of the present invention for achieving latent gaseous catalysis of suitable reaction systems comprises dispersing throughout a composite reaction system containing ingredients to be catalyzed, and adsorbent having adsorbed thereon a gaseous catalyst and subsequently heating the reaction system sufficiently to desorb a catalytic quantity of said gaseous catalyst or catalysts.

The terminology "gaseous catalyst" as used in this specification refers to the physical state of the catalyst at the instant of desorption. Thus, a material such as bromine having a boiling point of 59° C. atmospheric pressure can be adsorbed directly from its liquid state but upon desorption the bromine dissociates from the adsorbent surface as a gaseous material and therefore is within the scope of the term "gaseous catalyst."

Reaction systems in which the present invention is operable can be described as composite systems comprising a mixture of various amounts of solids, liquids and/or gases.

Examples of such systems include in situ acid gas catalyzed copolymerization, homopolymerization and cross-linking of such monomers as styrene, α-methylstyrene, chlorostyrene, divinylbenzene-ethylvinylbenzene mixture, diisopropenyl, diphenyl, divinyl ether of diethylene glycol, vinyl sulfides and the like. Generally, prerequisite to operable liquid composites, i.e., those reaction systems having the overall characteristics of liquids, are reacting ingredients which are not mutually adsorbable upon the catalyst carrying adsorbent and further that the adsorbed gaseous catalyst is not subject to displacement on the adsorbent by an ingredient of the composite system. In solid composite systems, i.e., those reaction systems having the overall characteristics of solids, the general immobility of the ingredients substantially obviates the problems intrinsic in liquid systems.

An element of the present invention having an important bearing on the successful operation of latent catalysis is the particular adsorbent employed. The ideal adsorbent has a high capacity for the gaseous catalyst and at normal temperatures it should have a low degree of reversibility, i.e., in the event of an adsorbed gaseous catalyst a very low partial pressure above the adsorbent-catalyst system. Although the adsorbent should not release the catalyst too readily, i.e., it should have a relatively high desorption activation energy, it should be capable of nearly complete desorption upon a moderate increase in energy input at temperatures well below the decomposition or boiling point of the reaction system.

It is preferred to employ adsorbents having the parameters of at least 100 square meters of adsorbent surface per gram and a (pore) radius from 10 to 200 angstroms. Adsorbents falling outside these limits can be employed, but as a practical matter, adsorbents having smaller adsorptive areas and larger pore sizes will not have adequate capacity for the gaseous catalysts. Furthermore, excessive amounts of such adsorbents would have to be incorporated into the reaction mixture as inert impurities in order to obtain adequate catalysis. Examples of adsorbents operable in the present invention include carbonaceous materials such as activated carbons and carbon blacks. Others include activated clay, activated alumina, silica and the like.

Substantial desorption of the adsorbed gaseous catalyst is obtained by subjecting the adsorbent catalyst combination to heat treatment at temperatures of about 100° to 300° C. for periods of time ranging from 1 to 15 minutes.

The catalyst-adsorbent combination is prepared by conventional means whereby an activated adsorbent is subjected to a total or partial pressure of a desired gaseous catalyst. In most instances the resulting catalyst-adsorbent product can be handled without extraordinary precautions, and consequently it may be blended into the reaction system to be catalyzed by ordinary mechanical means. The reaction system is then heated to achieve the desired extent of catalysis.

As a practical matter, in such method of affecting catalysis there is an intrinsic limit on the period of latency resulting from reversibility of the desorption process at normal room temperatures and pressures. However, an effective period of latency (the shelf life) can be achieved in most types of reaction systems from 2 to 24 hours before the composite reaction system has undergone significant premature reaction. Also, it is possible to obtain in a reaction system not previously heat-treated some degree of latent catalysis in situ many days after the incorporation of the adsorbent-catalyst combination.

The use of catalyst-adsorbent combinations to catalyze certain resin binders employed by the foundry industry in their manufacture of molds and cores which are hardened by acid gas catalyzed reactions is a particular facet of the present invention. A conventional method for preparing cores and molds bound with such resinous materials involves mixing sand particles with the resin, molding the mixture into the shape desired by application of pressure and then externally gasing the mold or core object with the desired acid gas catalyst to cure the resinous binder. As a result of this method considerable amounts of obnoxious gases are unavoidably released into the surrounding environment.

The present invention avoids this problem since the gaseous catalyst is first adsorbed on a suitable adsorbent and then uniformly and intimately dispersed by conventional foundry mixing and mulling techniques throughout the core and mold compositions. Upon subsequent heating of the mold or core, a catalytic quantity of gaseous catalyst is desorbed, thereby facilitating the cure of the resinous binder in situ.

The usual temperatures at which foundry mold and core materials are worked does not cause desorption of the gaseous catalyst in significant quantities, and, therefore, molding and core compositions containing the catalyst-adsorbent can be worked and handled for substantial periods of time before the deleterious effects, i.e., decreases in workability, become substantial. This period of time is designated as the shelf life of the mixture.

The present invention also circumvents diffusion problems which accompany gaseous catalysis of solid systems. External gasing of solid reaction systems results in degree of reaction gradients throughout the solid according to the difficulty in obtaining diffusion of the gaseous catalyst. In large objects, the centers may remain uncatalyzed while the outer regions are over catalyzed.

More particularly the employment of this invention in foundry processes for molds and cores involves the use in an admixture the basic components of a sand, an acid gas catalyzed binder, an acid gas catalyst, and an adsorbent. The acid gas catalyst is added to the system in an adsorbed state.

The method of achieving catalysis of such a reaction system comprises dispersing throughout a mixture of foundry sand and an acid gas curable resin, an adsorbent having adsorbed thereon an acid gas and subsequently heating a shaped core or mold formed from such a mixture to desorb a sufficient quantity of the acid gas to cure the resin in situ.

The sand employed can be any of the American Foundrymen's Society classified sands conventionally employed in foundry molds and cores. Other materials such as the bentonite clays and the like may also be incorporated in the mixture, but generally, the resins (frequently referred to as binders) catalyzed by the method of this invention are employed with substantially pure sand.

Resins subject to the latent gaseous catalytic procedure of the present invention and which may be used as binders for sand molds include, for example, such thermally cured condensation resins as urea formaldehyde, phenol formaldehyde, cresol formaldehyde, melamine formaldehyde, furfural, triazine formaldehyde and the like. Generally, any acid gas catalyzed resin which imparts to the sand composition adequate cured strength, good shake-out properties, and high permeability as cured, is operable. Shake-out properties, i.e., looseness of the sand after the metal has cooled, are essential for removal and recovery of the sand and high permeability is necessary to permit the escape of gases evolved on the contact of molten metal with the molding composition. Amounts of the acid catalyzed binder employed range from .5 to 5 percent by weight of the sand.

The catalyst-adsorbent combination is prepared in a closed system by subjecting an adsorbent such as carbon black, charcoal, alumina, and the like to a partial or total pressure of a gaseous catalyst selected from a group of acid forming or acidic gases which includes chlorine, bromine, fluorine, hydrogen chloride, hydrogen bromide, hydrogen fluoride, sulfur dioxide, sulfur trioxide, nitrous oxide, boron trichloride, boron trifluoride and the like materials which when dissolved in water produce acids.

The quantity of the adsorbent-catalyst combination employed in the admixture of sand and binder is that amount necessary to achieve the desired degree of curing without the evolution of excess gas. It is most expedient to use as little as possible of the curing or hardening catalyst since greater amounts proportionately decrease the shelf life of the mixture. Variables to be considered in connection with determining amounts of the catalyst-adsorbent combination to be employed are (1) the amount of the adsorbed catalyst in the combination, (2) the extent to which this catalyst will be desorbed under the conditions of its use, and (3) the amount of resin to be catalyzed. In most systems the desorption activation energy is adequately supplied by subjecting the entire reaction system to temperatures ranging from 100° to 300° C. for periods of time ranging from about 1 to 30 minutes.

Desirable temperatures range from about 140° to 170° C. and at such temperatures most acid gas catalyzed resins as employed in the present invention cure at a maximum rate as desorption occurs for a period of time from about 4 to 20 minutes. It is believed that upon continued heating, little desorption of the acid gas catalyst occurs but the heat alone can have a considerable effect on the properties of the resin bound core. In some instances continued heating substantially decreases strength while in others the resins may be further hardened by additional heating.

The aforementioned resin-types are usually alternatively curable by conventional means such as the application of heat, or by heat and an externally applied gaseous catalyst. The present invention, however, decreases the required curing time by factors from ½ to 1/10 of that necessary for the conventional methods and avoids the problems presented by conventional gaseous catalysis methods.

The quantity of an adsorbent-catalyst combination employed under normal temperatures of about 35° C. and atmospheric pressure, ranges from about .1 to 10 percent by weight of the resin employed. Over this range the most desirable amount is a function of the particular reactants which are to be catalyzed and the amount of catalyst adsorbed. For most adsorbent catalyst combinations, the amount of gaseous catalyst available in the adsorbed state varies from about 1 to 40 percent by weight of the adsorbent.

A preferred embodiment of this invention as it is employed to produce foundry sand molds and cores involves incorporating by mechanical means into a foundry sand about 3 percent by weight of the sand of an urea formaldehyde resin and about .06 percent by weight of the sand a catalyst-adsorbent combination containing about 30 percent by weight of adsorbed chlorine. This admixture which has a shelf life of more than two hours is then ready for the mold or core forming operation which is carried out by tamping or ramming the mixture into a pattern mold. The molds or cores so prepared are then brought to a temperature of about 150°–200° C. and held there for five minutes. The cured molds or cores of the above composition have at this point a dry hardness of about 100 and a tensile strength of over 200 pounds per square inch as measured on the H. W. Dietert Co.'s Dry Hardness Tester and a Universal Sand Strength Machine, respectively.

The following examples are illustrative of the invention and should not be construed as limitations thereof. The tensile strength and hardness measurements were made on Standard American Foundrymen's Society equipment and according to standard techniques.

Example I

To a liquid urea formaldehyde solution (85 percent solids) was added .5 percent by weight of a charcoal-chlorine combination containing 27 percent by weight adsorbed chlorine. The composite system was then heated to 150° C. and in less than one minute the entire mass had cured as a hard mass. Without heating the catalyst containing composite had a shelf life of over three hours.

Example II

Gratiot bank sand in an amount of 970 grams, 30 grams of an urea formaldehyde resin containing 85 percent solids and 0.6 gram of norite (charcoal) having adsorbed thereon, chlorine to the extent of 27.6 weight percent were mixed by a mechanical mixer. One hundred grams of the thoroughly mulled combination was placed in a dogbone mold and tamped three times to compress the material into the recesses of the mold. The "green" sand core was then removed from the mold and heated in an oven at 160° C. for five minutes. After cooling, the sand core was tested and found to have tensile strength of 265 pounds per square inch and hardness of 98.

Example III

In a manner similar to that of Example II, 970 grams of Gratiot bank sand was mixed with 30 grams of urea formaldehyde and 0.3 grams of norite having bromine adsorbed thereon to the extent of 41.2 weight percent. A dogbone mold formed from 100 grams of this composition, as in Example II, was heated at 160° C. for four minutes. The resulting core when cooled had a tensile strength of 220 pounds per square inch and hardness of 95.

Example IV

In a manner similar to that of Example II, 980 grams of Gratiot bank sand was mixed with 20 grams of urea formaldehyde and 1.2 grams of norite having hydrogen chloride adsorbed thereon to the extent of 11.2 weight percent. A dogbone mold of 100 grams of this mixture was formed as in Example II and was heated at 160° C. for four minutes. After cooling the core had a tensile strength of 175 pounds per square inch and a hardness of 95.

Example V

In a manner similar to that of Example II, 970 grams of a Gratiot bank sand was mixed with 30 grams of a phenol formaldehyde resin consisting of 100 percent solids. From this mixture a portion was formed in a dogbone mold.

To a second batch of resin and sand identical to that previously prepared was added .9 gram of a charcoal-chlorine combination, chlorine being adsorbed on the charcoal to the extent of 30 percent chlorine by weight. A second dogbone mold was formed from this mixture. The uncatalyzed and catalyzed molds were heated at 150° C. in an oven. After 13 minutes the catalyzed mold had obtained a tensile strength of 210 pounds per square inch whereas the uncatalyzed mold had obtained a tensile strength of only 80. The shelf life of the catalyzed batch was more than 24 hours.

Example VI

In a manner similar to that of Example II, 980 grams of Gratiot bank sand was mixed with 30 grams of melamine formaldehyde resin consisting of 60 percent solids. A dogbone mold was prepared from this uncatalyzed mixture. To a second batch prepared in the above manner .9 gram of charcoal-chlorine containing 30 percent adsorbed chlorine by weight was added and from this mixture a second dogbone mold was prepared. After curing in an oven at 150° C. for 16 minutes the catalyzed mold had achieved a tensile strength of 95 pounds per square inch whereas the uncatalyzed mold had a tensile strength of only 5 pounds per square inch. Again the shelf life of the catalyzed mixture was more than 24 hours.

Example VII

In a manner similar to that of Example II, 970 grams of Gratiot bank sand was mixed with 30 grams of triazine-formaldehyde resin containing about 55 percent solids. From this mixture a dogbone mold was formed as before. To an identical batch was added .9 gram of charcoal-chlorine, chlorine being adsorbed on the charcoal to an extent of 30 percent by weight. After curing at 160° C. in an oven for 15 minutes the catalyzed mold had a tensile strength of 75 pounds per square inch whereas the uncatalyzed mold had a tensile strength of only 5 pounds per square inch. The catalyzed batch had a shelf life of about 16 hours.

In a similar manner to that of the foregoing examples, it is possible to substitute for the acid gas employed therein to the achieved comparable results such acid gases as fluorine, hydrogen bromide, hydrogen fluoride, sulfur dioxide, sulfur trioxide, nitrous oxide, boron trichloride, boron trifluoride and the like. Also, comparable results are achieved by the substitution of cresol formaldehyde, and furfural for the resins of the above examples.

It is obvious from the foregoing specification that modifications may be made in this invention without departing from the spirit and scope thereof and it should be understood that the invention is limited only as defined in the claims as read in light of the specification.

I claim:
1. A method which comprises the steps of
 (1) dispersing throughout a composite reaction system comprising
  an inert filler and
  a condensation resin thermally curable in the presence of a catalytic amount of an acidific material, which is gaseous at the curing temperature of the resin and which, when dissolved in water, produces an acid,
  an inert adsorbent having more than 100 square meters per gram of adsorbing surface and having adsorbed thereon said acidific material, which is desorbable at the curing temperature of the resin; and
 (2) subsequently heating the composite reaction system at the curing temperature of the resin.
2. The method as in claim 1 wherein the inert adsorbent employed is an activated carbon.

3. The method as in claim 1 wherein the inert adsorbent employed is an activated clay.

4. A method as in claim 1 wherein the inert adsorbent employed is an activated alumina.

5. A method as in claim 1 wherein the condensation resin is selected from the group consisting of urea-formaldehyde, phenol-formaldehyde, melamine-formaldehyde and triazine-formaldehyde partially condensed resins.

6. The method as in claim 1 wherein the acidific gas is selected from the group consisting of fluorine, chlorine, bromine, hydrogen fluoride, hydrogen chloride, hydrogen bromide, sulfur dioxide, sulfur trioxide, nitrous oxide, boron trichloride and boron trifluoride.

7. A method which comprises the steps of
(1) dispersing throughout a foundry sand mixture comprising
    sand and
    a condensation resin thermally curable in the presence of a catalytic amount of an acidific material, which is gaseous at the curing temperature of the resin and which, when dissolved in water, produces an acid,
an inert adsorbent having more than 100 square meters per gram of adsorbing surface and having adsorbed thereon said acidific material, which is desorbable at the curing temperature of the resin;
(2) subsequently heating a formed shape composed of the foundry sand mixture at the curing temperature of the resin.

8. A method as in claim 7 wherein the inert adsorbent is an activated carbon.

9. A method as in claim 7 wherein the inert adsorbent is an activated clay.

10. A method as in claim 7 wherein the condensation resin is a partially condensed phenol-formaldehyde resin.

11. A method as in claim 7 wherein the condensation resin is a partially condensed urea-formaldehyde resin.

References Cited in the file of this patent

UNITED STATES PATENTS

| | | |
|---|---|---|
| 2,422,118 | Meyer | June 10, 1947 |

FOREIGN PATENTS

| | | |
|---|---|---|
| 205,974 | Australia | Jan. 29, 1957 |

OTHER REFERENCES

Linde Company Pamphlet "Chemical Loaded Molecular Sieves," July 1, 1959 (6 page text plus 2 page cover letters establishing date).